United States Patent Office 2,785,044
Patented Mar. 12, 1957

2,785,044

PRODUCTION AND USE OF SOLUTIONS OF ACRYLONITRILE POLYMERS

John Downing, Arthur Hodge, and James Gordon Napier Drewitt, Spondon, near Derby, England, assignors to British Celanese Limited, a corporation of Great Britain No Drawing. Application June 14, 1951, Serial No. 231,664

Claims priority, application Great Britain June 29, 1950

11 Claims. (Cl. 18—54)

This invention relates to solutions of polyacrylonitrile and of copolymers containing acrylonitrile as the preponderating constituent, and to the production from such solutions of shaped articles such as fibres and films.

A class of polymer of increasing importance consists of polyacrylonitrile and copolymers of acrylonitrile with other unsaturated compounds, especially vinyl compounds. Examples of such other unsaturated compounds are: substituted acrylonitriles, e. g. methacrylonitrile; vinyl esters, e. g. vinyl chloride and vinyl acetate; acrylic acid derivatives, e. g. methyl acrylate and phenyl acrylate; styrene and its derivatives; and vinylidene chloride. Polyacrylonitrile itself and such copolymers with other unsaturated compounds as contain a preponderating proportion of acrylonitrile are in the present specification referred to as acrylonitrile polymers. It is well known that acrylonitrile polymers, especially such as have fibre-forming properties, are in many cases insoluble in the organic liquids commonly employed as solvents, and that this constitutes a considerable difficulty in the way of utilising these polymers.

We have now found that acrylonitrile polymers, especially such as are fibre-forming, can be dissolved in solvent mixtures of nitromethane, water, and formic or oxalic acid, or if desired both formic and oxalic acids. In the case of solvent mixtures comprising formic acid, we prefer to use mixtures comprising 2–20 volumes of water and 5–85 volumes of formic acid, and especially 4–10 volumes of water and 20–55 volumes of formic acid, for each 100 volumes of nitromethane; in all such mixtures the preferred ratio of water to formic acid is between 1:4 and 1:9 by volume. Mixtures containing 8–18 volumes of water and 5–20 volumes of formic acid for each 100 volumes of nitromethane also give good results. If oxalic is used in place of the formic acid, we prefer to use mixtures containing 90–25% by weight of nitromethane, 6–50% by weight of oxalic acid, and 2.5–20% by weight of water. It is convenient to supply the oxalic acid and water together in the form of oxalic acid dihydrate, and we have found that mixtures containing 90–25% of nitromethane and 10–75% of oxalic acid dihydrate are very satisfactory.

The invention is of particular value in the formation and use of solutions of polyacrylonitrile itself, and of such copolymers of acrylonitrile and other unsaturated compounds as are insoluble in acetone. Examples of such copolymers are copolymers containing 85% or more of acrylonitrile and 15% or less of vinyl chloride, or 60% or more of acrylonitrile and 40% or less of methacrylonitrile. Such copolymers are as a rule easier or at least no more difficult to dissolve in the solvent mixtures of the invention than is polyacrylonitrile itself, and it will therefore be convenient in describing the invention in more detail to refer specifically to polyacrylonitrile.

The polyacrylonitrile may be dissolved, for example, by adding it to the required amount of the solvent mixture and heating preferably to about 80° C. or higher, for instance to 80°–90° C. Advantageously the solvent mixture containing the polyacrylonitrile may be boiled under reflux conditions. If desired however higher temperatures, e. g. up to 120°–130° C., may be used, the heating then being effected in a closed vessel; the use of such temperatures may be of advantage when a relatively concentrated solution, e. g. a 20–25% solution, of the polyacrylonitrile is to be made. Another method by means of which more rapid solution may often be achieved, is to add the polyacrylonitrile to substantially pure nitromethane, heat to a temperature above 80° C. and then mix in the required amount of the formic or oxalic acid and water. If desired the solvent mixture or the nitromethane (according to which method is adopted) may be heated near or to the temperature at which solution is to be effected before the polyacrylonitrile is added. The solutions once formed, especially solutions of concentration below 25%, and more particularly below 20%, can be cooled considerably without undergoing immediate gelling, though in some cases the cooled solutions may gel if left to stand for a fairly long time.

When the solutions are to be used for the production of one- or two-dimensional shaped articles, such as fibres or films, by extrusion or casting methods, it is preferable that the viscosity of the polyacrylonitrile or other acrylonitrile polymer (measured in 1% solution in dimethyl formamide at 20° C.) should be between about 2.5 and 4 centistokes, and especially between about 3 and 3.5 centistokes. The concentration of the solution is preferably between about 5% and 25%, and especially 7.5–20%, concentrations of 10%–20% being particularly useful.

The shaped articles are preferably made by a wet-spinning or wet-casting method, suitable coagulating liquids being carboxylic acid esters of boiling point above 250° C., in particular dialkyl phthalates, as described in U. S. application S. No. 257,198, filed November 19, 1951 of J. Downing and J. G. N. Drewitt. The spinning solution and coagulating liquid may be at about room temperature, but it is usually better that the spinning solution should be at an elevated temperature, especially between about 60° or 70° C. and its boiling point, and that the coagulating liquid should be at a temperature within about the same range.

Fibres made in accordance with the invention are preferably oriented by stretching in order to increase their tenacity. A certain degree of stretch may be imparted to the fibres in the course of the spinning operation, but whether this is done or not the fibres are preferably stretched by several times, e. g. by 5–15 times, their length in a subsequent operation. For example wet-spun fibres, after leaving the coagulating bath, may be wound up and washed (e. g. in the form of multi-filament yarns), and then stretched while heated; for example they may be stretched in hot air, wet steam, or water at a temperature above 80° C. as described in British Patent 636,476, or while they are passed in contact with a hot metal surface, e. g. the surface of a plate or roller kept at about 120°–150° C. To obtain a yarn of the highest tenacity it is advantageous to stretch the fibres as soon as possible after coagulation is complete; for example they may be stretched continuously with their formation, if desired after an intermediate wash with water. If the separate filaments in a multi-filament yarn show any tendency to stick together or coalesce during the stretching operation, this can generally be prevented by passing the yarn through an aqueous oil emulsion, or otherwise applying an aqueous oil emulsion to the yarn before it is heated and stretched, or by carrying out the stretching operation in an aqueous oil emulsion at an elevated temperature, especially at a temperature above 80° C., as described in British Patent 636,476. After being stretched the fibres may be treated to increase their extensibility by heating them, e. g. to about 140°–200° C., in the absence of tension until no more shrinkage takes place.

Films and like two-dimensional articles made in accordance with the invention may also be stretched to increase their tenacity.

While the solutions of the invention are of particular value in the production of fibres and films and other one- and two-dimensional articles by extrusion or casting methods, they may also be employed for other purposes, e. g. for the production of coatings of acrylonitrile polymers.

The following examples illustrate the invention.

*Example 1*

Polyacrylonitrile having a viscosity (in 1% dimethyl formamide solution at 20° C.) of 3.4 centistokes, and made by polymerising acrylonitrile in 18 times its weight of water using ammonium persulphate as catalyst, was boiled under reflux conditions with a mixture of 80 parts by weight of nitromethane, 15 parts by weight of oxalic acid, and 5 parts by weight of water until a clear homogeneous solution had formed. The solution was cooled to 80° C., and at this temperature extruded in the form of filaments into a coagulating bath of dibutyl phthalate, also at 80° C. The filaments were wound up as a yarn, washed with water, stretched by 6 times their length while passing over a plate heated to 140° C., and relaxed by heating them to 150° C. in the absence of tension until they no longer shrank. The resulting yarn had good tenacity and extensibility.

*Example 2*

The procedure of Example 1 was followed, using as the solvent a mixture of 75 parts by weight of nitromethane and 25 parts by weight of oxalic acid dihydrate.

*Example 3*

The procedure of Example 1 was followed, using as solvent a mixture of 100 volumes of nitromethane, 30 volumes of formic acid and 6 volumes of water.

*Example 4*

The procedure of Example 1 was followed, using as solvent a mixture of 100 volumes of nitromethane, 10 volumes of formic acid and 10 volumes of water.

Having described our invention, what we desire to secure by Letters Patent is:

1. Compositions comprising a fibre-forming polymer of acrylonitrile containing in the polymer molecule at least 85% by weight of acrylonitrile, dissolved in a mixture of 90 to 25% by weight of nitromethane, 2.5 to 20% by weight of water and 6 to 50% by weight of oxalic acid.

2. Compositions comprising a fibre-forming polymer of acrylonitrile containing in the polymer molecule at least 85% by weight of acrylonitrile, dissolved in a mixture having the constitution of a mixture of 90 to 25% by weight of nitromethane and 10 to 75% by weight of oxalic acid dihydrate.

3. Compositions according to claim 1, wherein the viscosity of the polymer measured in 1% solution in dimethyl formamide at 20° C. is 2.5 to 4 centistokes.

4. Process for the production of a solution of a fibre-forming polymer of acrylonitrile containing in the polymer molecule at least 85% by weight of acrylonitrile, which comprises maintaining the polymer in contact with a mixture having the constitution of a mixture of 90 to 25% by weight of nitromethane and 10 to 75% by weight of oxalic acid dihydrate at a temperature exceeding 80° C. until a clear solution has been formed.

5. Process for the production of fibres and films and other one- and two-dimensional shaped articles, which comprises shaping a composition claimed in claim 1, and setting the shaped composition by means of a liquid coagulant.

6. Compositions comprising a polymer of acrylonitrile containing in the polymer molecule more than 50% by weight of acrylonitrile, dissolved in a mixture of 90–25% by weight of nitromethane, 2.5–20% by weight of water and 6–50% by weight of oxalic acid.

7. Process for the production of a solution of a polymer of acrylonitrile containing in the polymer molecule more than 50% by weight of acrylonitrile, which comprises maintaining the polymer in contact with a mixture of 90–25% by weight of nitromethane, 2.5–20% by weight of water, and 6–50% by weight of oxalic acid at a temperature exceeding 80° C. until a clear solution has been formed.

8. Compositions according to claim 6, wherein the polymer is polyacrylonitrile.

9. Compositions according to claim 6, wherein the polymer is a copolymer of acrylonitrile with another monovinyl compound.

10. Process according to claim 7, wherein the polymer is polyacrylonitrile.

11. Process according to claim 7, wherein the polymer is a copolymer of acrylonitrile with another monovinyl compound.

References Cited in the file of this patent

UNITED STATES PATENTS

| | | |
|---|---|---|
| 2,210,771 | Myles | Aug. 6, 1940 |
| 2,436,204 | D'Alelio | Feb. 17, 1948 |
| 2,515,206 | Finzel et al. | July 18, 1950 |
| 2,588,335 | Dalton | Mar. 11, 1952 |
| 2,658,879 | Beaman | Nov. 10, 1953 |